United States Patent [19]
Shockley et al.

[11] 3,955,935
[45] May 11, 1976

[54] DUCTILE CORROSION RESISTANT CHROMIUM-ALUMINUM COATING ON SUPERALLOY SUBSTRATE AND METHOD OF FORMING

[75] Inventors: Quentin O. Shockley, Indianapolis; James O. Hodshire, Mooresville, both of Ind.

[73] Assignee: General Motors Corporation, Detroit, Mich.

[22] Filed: Nov. 27, 1974

[21] Appl. No.: 527,611

[52] U.S. Cl. ................................. 29/194; 204/181
[51] Int. Cl.² ...................... B23P 3/00; C25D 13/02
[58] Field of Search ....................... 204/181; 29/194

[56] References Cited
UNITED STATES PATENTS

| | | | |
|---|---|---|---|
| 3,795,601 | 3/1974 | Brewer et al. | 204/181 |
| 3,819,338 | 6/1974 | Burgardt et al. | 29/194 |
| 3,869,779 | 3/1975 | Gedwill et al. | 29/194 |

*Primary Examiner*—Howard S. Williams
*Attorney, Agent, or Firm*—George A. Grove

[57] ABSTRACT

A long lived, ductile, corrosion resistant coating on a superalloy body, such as a turbine vane, preferably cobalt base, is formed by electrophoretically depositing a mixture of elemental aluminum powder and chromium-aluminum alloy powder on a superalloy substrate, and diffusing the "green" coating into the substrate. By electrodepositing on and diffusing into the alloy substrate a specified mixture of aluminum and chromium-aluminum alloy, the outward diffusion of chromium and nickel from the substrate and resultant agglomeration of precipitated carbides in the diffusion layer are minimized so that ductility of the aluminum-chromium rich coating is improved.

4 Claims, 7 Drawing Figures

DUCTILE CORROSION RESISTANT CHROMIUM-ALUMINUM COATING ON SUPERALLOY SUBSTRATE AND METHOD OF FORMING

The invention herein described and claimed was made under a contract or subcontract thereunder with the Department of Defense.

The invention relates to ductile, hot-corrosion resistant coatings for superalloys such as are employed in gas turbine engines. More specifically, the subject invention relates to a method of forming an aluminum-chromium diffusion coating on a superalloy substrate such that the resultant protective layer is both ductile and oxidation-sulfidation resistant.

The designers and manufacturers of gas turbine engines are continually faced with the problem of providing engines which will produce more power per unit weight and will operate over longer periods of time before overhaul. The first and second stages of the turbine section of the engine provide a particular challenge to engine designers because it is this part of the engine in which moving and stationary parts under considerable stress are subjected to extremely high temperatures. The problem is complicated by the fact that these parts do not remain at a uniform high temperature, but are alternately heated and cooled. In addition, they are subjected to strong hot-corrosion conditions from combustion gases due to residual oxidation constituents therein. In the common event the engine is operated in a marine atmosphere, the presence of salt air contaminants accelerate hot-corrosion degradation of turbine components.

Turbine engine designers looked predominantly to cobalt and nickel-based superalloys to provide high temperature strength and corrosion resistance. Then it was found that the useful life of turbine vanes and blades could be improved if a hot-corrosion resistant coating was applied over the superalloy substrates to resist attack by constituents of the combustion gases and environmental contaminants passing through the turbine. Aluminum coatings and aluminum-chromium alloy coatings (produced by diffusion) have been employed for hot-corrosion protection. As the turbine temperatures have increased and the desired life before overhaul was increased, more sophisticated coatings have been proposed, such as alloys of cobalt, chromium, aluminum and yttrium; iron, chromium, aluminum and yttrium; or nickel, chromium, aluminum and yttrium.

We have now found a new method of applying known constituents, aluminum and chromium, particularly to a cobalt base superalloy, so that the resulting coating structure is more ductile and hot-corrosion resistant.

It is an object of our invention to provide a method of forming a more durable aluminum-chromium coating on a superalloy substrate. The method involves electrophoretically codepositing a mixture of elemental aluminum powder and a chromium-aluminum alloy powder on the substrate, and thereafter diffusing the "green" powder coating into the base alloy by heating in a protective atmosphere. The resultant coating is capable of withstanding many heating and cooling cycles in a highly corrosive salt water spray environment without cracking, spalling, or deterioration from hot corrosion thereby providing improved protection to the superalloy turbine component.

It is a further object of our invention to provide a turbine engine component formed of a cobalt or nickel base superalloy, particularly a cobalt base superalloy, having more ductile and corrosion resistant aluminum-chromium coating than can be produced by prior art techniques such as the pack process.

In accordance with a preferred embodiment of our invention, these and other objects are accomplished by electrophoretically codepositing a powder mixture of (1) elemental aluminum and (2) a chromium-aluminum alloy consisting essentially of 70 to 80% by weight chromium and the balance aluminum on a surface portion of a preformed superalloy article such as a turbine nozzle vane. Preferably, 3 to 4 parts by weight of elemental aluminum powder are deposited per part of the chromium-aluminum alloy powder. When the green coating of powder mixture has been formed, the base alloy and coating are heated in a protective hydrogen atmosphere at about 1900°F. (about 1040°C.) for 5 to 10 hours. At this temperature the elemental aluminum powder and aluminum-chromium alloy powder interdiffuse with the alloy substrate. However, as a consequence of the presence of the pre-alloyed constituent, outward diffusion of chromium and nickel from the substrate is minimized. The precipitated carbide concentration in the diffusion layer is no higher than, and is usually less than the carbide content of the base material. Furthermore, there is no agglomeration of carbides at the interface of the coating and the substrate. The carbide deficient coating is unusually ductile as compared with the proper art aluminum and aluminumchromium coatings and is able to yield with the superalloy turbine vane structure in the high temperature environment and in repeated cycles from high temperatures to low temperatures. The coated article is usually cooled in the protective atmosphere furnace to below 1,000°F.

Depending upon the composition of the base alloy the article may then be reheated at temperatures and times necessary to develop the optimum strength properties of the substrate superalloy. The article is then subjected to a suitable surface cleaning treatment. Finally, it may be heated in air for up to about one-half hour at a temperature of approximately 1,300°F. and then air cooled. This produces a characteristic oxide layer on the coating which indicates that a coating has in fact been obtained were desired. The article is then ready for use under high stress in a high temperature hot-corrosion environment and for repeated cycling between high temperatures and low temperatures.

Other objects and advantages of our invention will become more apparent from a detailed description thereof which follows. Reference will be made to the drawings, in which:

FIG. 2c is a photomicrograph at 500 × of an aluminum-chromium diffusion coating on X-40 cobalt base alloy, the coating being formed initially from elemental aluminum and chromium particles in the same overall proportions as the metal coating constituents of FIG. 2a;

Figure 3A:
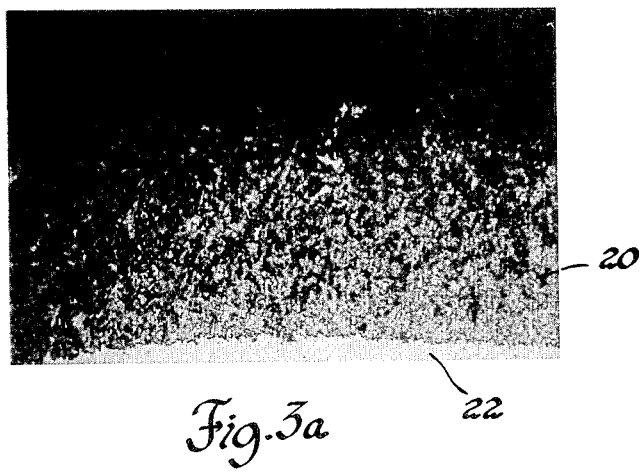
FIG. 3a is a photomicrograph at 500 × magnification of the subject aluminum-chromium diffusion coating on MAR-M509 cobalt base alloy.
Figure 3B:
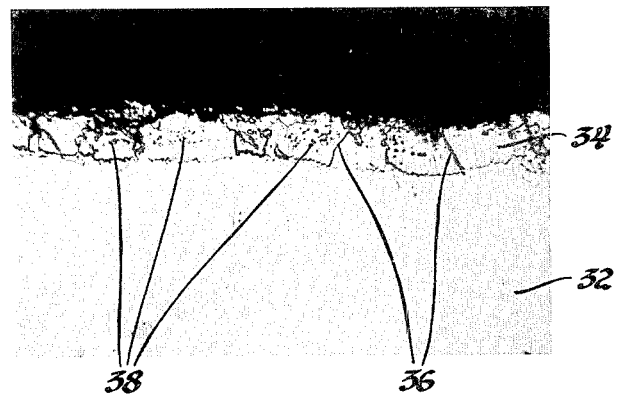
Figure 3C:
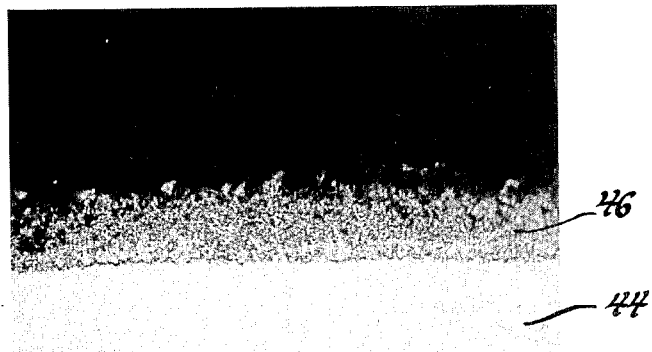

FIG. 3b is a photomicrograph at 500 × magnification of a prior art pack diffusion aluminum-chromium coating on MAR-M509 cobalt base alloy; and FIG. 3c is a photomicrograph at 500 × of an aluminum-chromium diffusion coating on MAR-M509 cobalt base alloy, the coating being formed initially from elemental aluminum and chromium particles in the same overall proportions as the metal coating constituents of FIG. 3a.

Preferred alloys for use as the base or core of composite articles in accordance with this invention are selected from the so-called cobalt base superalloys. These alloys necessarily contain, by weight, 50 to 75% cobalt, 20 to 30% chromium, up to about 10½% nickel, and up to 10% or 11% tungsten. They usually contain small amounts, less than 1% by weight, of carbon, manganese and silicon. They often contain up to about 6% or 7% by weight total of one or more of titanium, boron, silicon, iron, tantalum and columbium. They may also contain small amounts of impurities of sulfur, copper or phosphorus.

Examples of specific, suitable cobalt base alloys include MAR-M509 alloy (Martin Metals Company) and X-40 (Haynes-Stellite Company). The nominal analyses of these alloys are summarized in the following table. It is to be expected, of course, that there will be a variation of 10% or so in the amount of each element present from the nominal value listed.

|    | X-40 | MAR-M509 |
|----|------|----------|
| C  | 0.50 | 0.60 |
| Mn | 0.50 | 0.10 Max. |
| Si | 0.50 | 0.10 Max. |
| Cr | 25   | 21.5 |
| Ni | 10   | 10 |
| Co | Bal. | Bal. |
| W  | 7.5  | 7.0 |
| Ti | —    | 0.2 |
| B  | —    | 0.010 Max. |
| Zr | —    | 0.50 |
| Fe | 1.5  | 1.0 |
| Ta | —    | 3.5 |
| Cb | —    | — |

The subject aluminum-chromium coating may also be beneficially applied to nickel base superalloys. They serve as very effective protective coatings on such substrates. However, they demonstrate their protective properties most effectively on cobalt based alloy substrates.

Suitable nickel base superalloys necessarily contain, by weight, 40 to 80% nickel, 5 to 20% chromium, and may contain up to 10% molybdenum, up to 5.5% titanium, up to 6.5% aluminum, up to 3% columbium, up to 9% tantalum, up to 13.5% tungsten, up to 2% hafnium, up to 1% rhenium, up to 1.5% vanadium, up to 20% cobalt, and up to 3% iron. The nickel based alloys may also contain minor amounts of carbon, boron, zirconium, silicon and manganese. They are also likely to contain small amounts of impurities of sulfur, copper and phosphorus.

Examples of specific suitable nickel base alloys include MAR-M246 alloy (Martin Metals Company), Inco 738 (International Nickel Company), Inco 713C and TRW-VA A. The nominal analyses of these four alloys are summarized in the following table. It is to be expected, of course, that there will be a variation of 10% or so in the amount of each element present from the nominal value listed.

|           | MAR-M246 | 738      | Inco 713C | TRW-VI A |
|-----------|----------|----------|-----------|----------|
| Carbon    | 0.15     | 0.17     | .12       | 0.13     |
| Manganese | 0.10     | 0.2 Max. | —         | —        |
| Silicon   | 0.05     | 0.3 Max. | —         | —        |
| Chromium  | 9.0      | 16.0     | 12.5      | 6.0      |
| Nickel    | Bal.     | Bal.     | Bal.      | Bal.     |
| Cobalt    | 10.0     | 8.5      | —         | 7.5      |
| Molybdenum| 2.5      | 1.75     | 4.2       | 2.0      |
| Tungsten  | 10.0     | 2.6      | —         | 5.8      |
| Columbium | —        | 0.9      | 2.0       | 0.5      |
| Titanium  | 1.5      | 3.4      | 0.8       | 1.0      |
| Aluminum  | 5.5      | 3.4      | 6.1       | 5.4      |
| Boron     | 0.015    | 0.01     | 0.012     | 0.02     |
| Zirconium | 0.05     | 0.10     | .10       | 0.13     |
| Iron      | 0.15     | 0.5 Max. | —         | —        |
| Tantalum  | 1.5      | 1.75     | —         | 9.0      |
| Hafnium   | —        | —        | —         | 0.4      |
| Rhenium   | —        | —        | —         | 0.5      |
| Copper    | 0.10 Max.| —        | —         | —        |

Figure 1:
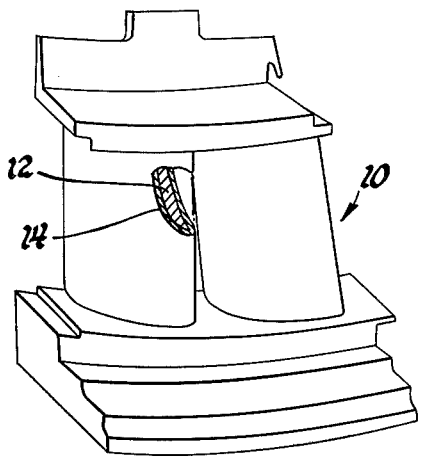
FIG. 1 is a cobalt base alloy turbine nozzle vane partly broken away and in section to show a ductile, corrosion resistant surface layer produced in accordance with this invention.

In general, the above alloys are casting alloys and articles intended to be formed from them are formed by casting. Referring to FIG. 1 of the drawings, there is shown a turbine nozzle vane 10 for a gas turbine engine of the axial flow type. In accordance with the subject invention this nozzle vane is formed of a cobalt alloy body portion 12 provided with a diffusion coating layer 14 initially consisting of a mixture of 3 to 4 parts by weight elemental aluminum powder and one part by weight of an alloy powder consisting essentially of 70% to 80% chromium, and the balance aluminum. For purposes of description, the thickness of the coating layer is considerably exaggerated in FIG. 1, the actual thickness of the diffusion coating being of the order of about 0.5 to 5 thousandths of an inch and preferably 1.5 to 4 thousandths of an inch. From the above it is apparent that the overall composition of the powder coating as electrophoretically applied is, by weight, about 14% to 20% chromium, and the balance aluminum. However, to obtain the benefits of the subject invention it is necessary to employ the specified mixture of elemental aluminum powder and prealloy powder. Of course, as the green coating is diffused into the substrate, the composition will change somewhat, but as will be described in more detail below, the resultant diffusion coating does not contain an excessive content of embrittling carbides resulting from outward diffusion from the alloy substrate.

In accordance with the subject invention the mixture of elemental aluminum powder and chromium-aluminum alloy powder is initially applied to the substrate by electrophoretic deposition. Such deposition involves applying a mixture of the aluminum and alloy particles to the base alloy article by first suspending the particles in an organic dielectric solvent. The article to be coated is immersed in the suspension and adapted as the cathode in a direct current electrical circuit. When subjected to a potential of 50 to 200 volts, preferably about 75 volts, the metal particles in the suspension are caused to deposit in a layer of uniform thickness on the cathodic base article. Subsequently, the coated article is heat treated in hydrogen to diffusion bond the metal particles with the base alloy.

A bath for the electrophoretic codeposition of elemental aluminum powder and chromium-aluminum alloy powder was prepared as follows. A quantity of a solvent mixture consisting of 60 ± 5% by weight isopropyl alcohol and 40 ± 5% by weight nitromethane was first prepared. Two grams of cobalt nitrate hexahydrate were then dissolved in a liter of these mixed solvents to make up a first solution — solution A. A second solution — solution B — was prepared by dissolving 10.8 grams zein in a liter of the same mixed solvents.

Two hundred milliliters of a bath solution suitable for electrophoretic deposition were then made up by mixing 10 milliliters of solution A, 50 milliliters of solution B and 140 milliliters of the above isopropyl alcohol-nitromethane mixed solvents. To this bath solution were added 1.7 grams of aluminum powder of less than 10 micron particle size and 0.5 gram of a chromium-aluminum alloy powder of about 5 micron particle size. The alloy powder consisted, by weight of 75% chromium and 25% aluminum. The metal particles and solution were thoroughly mixed in a blender. The resulting suspension was placed in a beaker and the suspension was further maintained by mild agitation.

A turbine nozzle vane cast from X-40 cobalt base alloy was immersed in the suspension. It was adapted in a direct current electrical circuit to function as a cathode. A metallic strip (can be any suitable conductive material, e.g. copper, stainless steel, nickel, etc.) shaped to fit closely about the turbine nozzle vane was adapted as an anode and immersed in the bath adjacent the vane. A direct current potential of 75 volts was applied between the cathodic turbine vane and the anode for one minute at room temperature. During this period the elemental metal powder and the metal alloy powder were homogeneously codeposited upon the turbine vane. A small amount of zein was deposited with the metals and it appeared to function as a binder and an electrical insulator. The thickness of the green coating was found to be about 5 mils.

The coated blade was air dried to evaporate residual solvent and subsequently placed in a hydrogen atmosphere furnace initially at room temperature. The furnace was heated to 1,350°F. and maintained at this temperature for 1 hour. The volatile and decomposable materials, such as zein and residual solvent, were removed from the coating and the aluminum was melted. The X-40 vane and coating were further heated in a hydrogen atmosphere at 1,900°F. for 5 hours. Following the five hour period the vane was rapidly cooled in the furnace by purging with cool hydrogen.

The composite turbine vane was then removed from the furance. Its surface was cleaned by blasting with 240 alumina grit at 17 psig air pressure. Some loose, powdery material was removed from the surface of the blade. The clean blade with its diffusion coating was then reheated in the furnace at 1,300°F. for about thirty minutes in air. The vane was the air cooled.

Figure 2A:
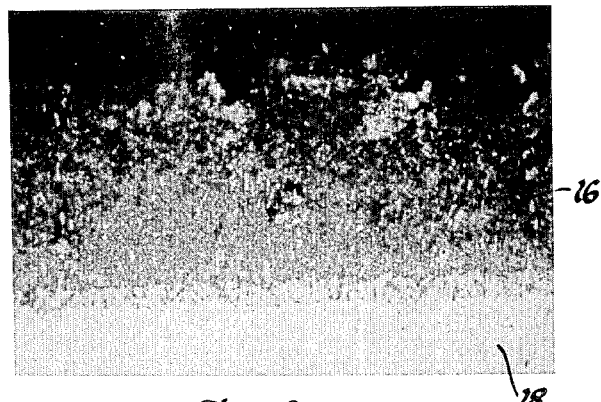
FIG. 2a is a photomicrograph at 500 × magnification of the subject aluminum-chromium diffusion coating on X-40 cobalt base alloy.
Figure 2B:
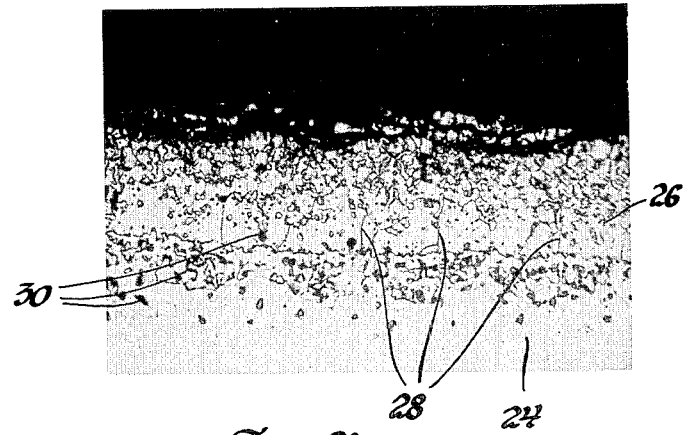
FIG. 2b is a photomicrograph at 500 × magnification of a prior art pack diffusion aluminum-chromium coating on X-40 cobalt base alloy.

The photomicrograph of FIG. 2a depicts a section of the diffusion coating 16 and underlying X-40 cobalt base alloy body portion 18 of a turbine vane in accordance with our invention. The photomicrograph of FIG. 3a depicts a section of the diffusion coating 20 and the underlying MAR-M509 cobalt base alloy portion 22 of a turbine vane prepared in accordance with our invention. The coating 20 was formed by the method set forth in detail above except that it was applied to a MAR-M509 cobalt base alloy substrate. Both coatings 16 and 20 are characterized by a uniform, fine grained structure with minimal agglomeration of carbides and the absence of colored grain boundaries. Both coatings are about 3½ mils in thickness which is desirable for a suitable service life in a gas turbine engine. The fine grain structures of our protective diffusion coating contributes to its superior resistance to hot corrosion, thermal cracking and spalling types of failures. FIGS. 2b and 3b are photomicrographs of aluminum-chromium diffusion coatings on X-40 (2b) and MAR-M509 (3b), respectively. However, the diffusion coatings depicted in these photomicrographs were formed by the prior art pack diffusion process. In the pack process the superalloy turbine component is cleaned and placed in a suitable retort. A pack material made of a homogeneous mixture of finely divided aluminum oxide, ammonium chloride, aluminum and chromium is prepared and packed in the retort around the components to be coated. In the preparation of the pack diffusion coatings depicted in FIGS. 2b and 3b the overall proportion by weight of elemental aluminum to elemental chromium was about 85 to 15 — substantially the same as the corresponding overall ratio in the initial coatings depicted in FIGS. 2a and 3a. The pack diffusion of aluminum and chromium is carried out at about 1,900°F. for 5 to 10 hours, in accordance with recognized prior art techniques, to form a diffusion bonded surface coating.

In FIG. 2b the cobalt base superalloy substrate is indicated at 24 and the aluminum-chromium pack diffusion layer is seen at 26. Te pack diffusion coating is only about 1½ mils in thickness and it is characterized by ordered grain boundaries 28 and agglomerated carbides 30. In FIG. 3b the MAR-M509 cobalt alloy substrate is seen at 32 and the aluminum-chromium pack diffusion coating at 34. The pack coating 34 is less than one mil thick. It also is characterized by ordered grain boundaries 36 and the agglomeration of carbides is seen at 38. The agglomerated carbides in these coatings and the presence of ordered grain boundaries makes them more susceptible to hot corrosion, thermal cracking and spalling types of failures.

Figure 2C:
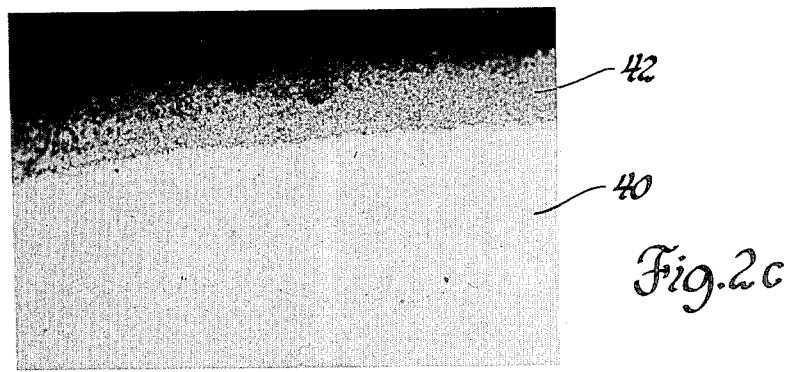

The photomicrographs of FIGS. 2c and 3c also illustrate aluminum-chromium diffusion coatings on cobalt base superalloy substrates. Here mixtures of elemental powders of aluminum and chromium in the weight proportion of about 85 to 15, respectively, were electrophoretically deposited on X-40 superalloy (FIG. 2c) and MAR-M509 superalloy (FIG. 3c). No prealloyed powders were employed. The green coated turbine components were heated in a hydrogen atmosphere at about 1,900°F. for about five hours to produce a diffusion bond between the coating and the substrate. In FIG. 2c the X-40 substrate is indicated at 40 and the diffusion coating at 42. In FIG. 3c the MAR-M509 substrate is indicated at 44 and the diffusion coating at 46. Both diffusion coatings 42 and 46 are considerably thinner (only about one mil) than the diffusion coatings produced in accordance with the subject process as indicated at 16 and 20 in FIGS. 2a and 3a, respectively. This occurred despite the fact that the mass of electrophoretically deposited green coating was substantially the same in each case. While they are characterized by a uniform fine grain structure in contrast to the coating produced by the pack diffusion process, there is indication of a linear orientation of carbides at the coating substrate interfaces. As will be shown below in actual corrosion tests, the diffusion coatings produced after initially electrophoretically depositing elemental powders of chromium and aluminum have significantly shorter service lives than the coatings produced in accordance with the subject invention.

It is believed that the success of the subject process in producing a ductile, hot corrosion resistant coating results essentially from the employment of the specified prealloyed aluminum-chromium powder with elemental aluminum powder. The prealloying of part of the aluminum with chromium in the proportions recited substantially retards the diffusion of aluminum into the substrate and consequently the outward diffusion of constituents from the substrate. By inhibiting outward diffusion of substrate constituents the agglomeration of carbides is minimized or eliminated and this significantly contributes to the life and effectiveness of the aluminumchromium diffusion coating.

Turbine vanes of X-40 and MAR-M509 cobalt base alloys produced in accordance with the subject procedure were subjected to hot corrosion tests at temperatures up to 1,900°F. in a spray of sodium sulfate. The vanes were mounted on a rotating fixture which continually moved them into and out of a 1,900°F. furnace through a spray of the corrosive material. The blades sustained in excess of 4,000 such cycles without coating failure. By way of comparison, an aluminum-chromium pack coating containing 10 to 15% chromium on the same base alloys sustained only an average of about 350 cycles before failure. When a mixture of aluminum powder and chromium powders were electrophoretically applied on an X-40 cobalt base alloy, the overall chromium content being about 12 – 15%, and the blades subjected to the hot corrosion test, they sustained only 500 to 600 cycles before coating failure. Finally, when the alloy powder consisting of 10 to 15% chromium in aluminum was electrophoretically applied to an X-40 cobalt base alloy, little or no diffusion of the coating into the substrate could be obtained despite prolonged heating at 1,900°F. The loose coating was very brittle and not satisfactory for hot corrosion testing. Air cooled turbine vanes made of MAR-M509 cobalt based alloy and others made of X-40 alloy, all provided with an aluminumchromium diffusion coating by the subject process, have been subjected to accelerated cyclic testing in gas turbine engines. The hot corrosion resistance of the turbine vanes was tested by accelerated sea salt ingested tests to simulate marine atmospheres. Each cycle consisted of 30 minutes at 1970°F. turbine inlet temperatures with 0.75 ppm synthetic sea salt ingested through the fuel nozzles followed by 10 minutes of ram air cooling. The high salt concentration gives a severe marine-type engironment and the engine heating-cooling cycle produced extreme thermal gradients. The subject coated vanes have shown excellent performance under the test conditions. They were superior to like vanes protected with prior art coatings. From the above tests we have concluded that by electrophoretically depositing a mixture of elemental aluminum powder and a chromium rich aluminum alloy powder as described on a cobalt alloy substrate, a marked improvement in the ductility and the corrosion resistance on diffused chromiumaluminum alloy coating is obtained.

Although other organic dielectric suspension mediums can be provided, we prefer to use the above-described mixture of isopropyl alcohol and nitromethane and employ zein as the temporary binder for the green coating. We employ about 3 to 4 parts of elemental aluminum powder per part of prealloyed chromium-aluminum powder. Preferably, 3 to 4 grams of aluminum powder and one gram of chromium-aluminum alloy powder are dispersed in about 400 milliliters of the above-described organic liquid mixture. This suspension is readily deposited at about 75 volts DC onto cobalt base alloy substrates. After about one minute deposition time, a suitable porous green coating of 5 to 20 mils is obtained. We have found that if proportions of aluminum and prealloyed powder are employed outside the stated limits, deficient coatings are obtained. Moreover, it is preferable, when employing isopropanol nitromethane mixtures as the suspension medium, that the concentrations of the aluminum and alloy powder for electrophoretic deposition be about 6 to 9 grams per liter of medium and a 1.5 to 3 grams per liter, respectively. Upon heating in a hydrogen atmosphere at about 1,900°F. for about five to ten hours the diffusion layer of 1 to 4 or 5 mils in thickness is produced, which as shown provides excellent corrosion resistance despite repeated fluctuations between a high temperature engine operating condition and a low temperature engine off condition.

We have found that it is critical that the diffusion of the electrophoretically applied coating be carried out at about 1,900° ± 25° F. to obtain a high quality coating.

Although the invention has been described in terms of certain specific embodiments, it is to be understood that other forms might be adopted in the scope of the invention.

What is claimed is:

1. A method of forming a ductile, corrosion resistant coating on a cobalt base superalloy or nickel base superalloy substrate comprising:

electrophoretically codepositing a mixture containing, on a proportional weight basis, 3 to 4 parts elemental aluminum powder and one part of an alloy powder consisting essentially by weight of 70 to 80% chromium and the balance aluminum on a surface portion of a preformed article, made of a high temperature resistant alloy taken from the group consisting of cobalt base alloys and nickel base alloys, to form a porous coating of said mixture on said article and heating said article and coating at a temperature of about 1,900° F. in a protective atmosphere for at least about five hours whereby the aluminum and the chromium-aluminum alloy interdiffuse with said substrate to form a ductile, corrosion resistant coating, said cobalt base alloys consisting essentially by weight of 50 to 75% cobalt, 20 to 30% chromium, up to about 10½% nickel, up to 11% tungsten, up to 7% by weight total of one or more of titanium, boron, silicon, iron, tantalum and columbium, and minor amounts of carbon, manganese and silicon, and said nickel base alloys consisting essentially by weight of 40 to 80% nickel, 5 to 20% chromium, up to 10% molybdenum, up to 5.5% titanium, up to 6.5% aluminum, up to 3% columbium, up to 9% tantalum, up to 13.5% tungsten, up to 2% hafnium, up to 1% rhenium, up to 1.5% vanadium, up to 20% cobalt, up to 3% iron, and minor amounts of carbon, boron, zirconium, silicon and manganese.

2. A method of forming a ductile, corrosion resistant coating on a cobalt base superalloy substrate comprising:

electrophoretically codepositing a mixture containing, on a proportional weight basis, 3 to 4 parts elemental aluminum powder and one part of an alloy powder consisting essentially by weight of 70 to 80% chromium and the balance aluminum on a surface portion of a preformed article, made of a high temperature resistant cobalt base alloy to form a porous coating of said mixture on said article and heating said article and coating at a temperature of about 1,900° F. in a hydrogen atmosphere for at least about five hours whereby the aluminum and the chromium-aluminum alloy interdiffuse with said substrate to form a ductile, corrosion resistant coating, said cobalt base alloy consisting essentially by weight of 50 to 75% cobalt, 20 to 30% chromium, up to about 10½% nickel, up to 11% tungsten, up to 7% by weight total of one or more of titanium, boron, silicon, iron, tantalum and columbium, and up to 1% each of carbon, manganese and silicon.

3. A heat and corrosion resistant article comprising a cobalt base alloy or nickel base alloy substrate and an aluminum-chromium diffusion coating ½ to 5 mils in thickness on said substrate, the diffusion coating being the diffusion product of heating, at about 1,900° F. in a protective atmosphere, the substrate and a powder metal mixture electrophoretically applied thereto, the metal content of the mixture initially consisting essentially, on a proportional weight basis, of 3 to 4 parts aluminum powder and one part of an alloy powder consisting essentially by weight of 70 to 80% chromium and the balance aluminum, said cobalt base alloy consisting essentially by weight of 50 to 75% cobalt, 20 to 30% chromium, up to about 10½% nickel, up to 11% tungsten, up to 7% by weight total of one or more of titanium, boron, silicon, iron, tantalum and columbium, and minor amounts of carbon, manganese and silicon, and said nickel base alloy consisting essentially by weight of 40 to 80% nickel, 5 to 20% chromium, up to 10% molybdenum, up to 5.5% titanium, up to 6.5% aluminum, up to 3% columbium, up to 9% tantalum, up to 13.5% tungsten, up to 2% hafnium, up to 1% rhenium, up to 1.5% vanadium, up to 20% cobalt, up to 3% iron, and minor amounts of carbon, boron, zirconium, silicon and manganese.

4. A heat and corrosion resistant article comprising a heat resistant cobalt base alloy substrate and an aluminumchromium diffusion coating ½ to 5 mils in thickness on said substrate, the diffusion coating being the diffusion product of heating at about 1,900° F. in a hydrogen atmosphere, the substrate and a powder metal mixture electrophoretically applied thereto, the metal content of the mixture initially consisting essentially, on a proportional weight basis, of 3 to 4 parts aluminum powder and one part of an alloy powder consisting essentially by weight of 70% to 80% chromium and the balance aluminum, and said cobalt base alloy consisting essentially by weight of 50 to 75% cobalt, 20 to 30% chromium, up to about 10½% nickel, up to 11% tungsten, up to 7% by weight total of one or more of titanium, boron, silicon, iron, tantalum and columbium, and minor amounts of carbon, manganese and silicon.

* * * * *

UNITED STATES PATENT AND TRADEMARK OFFICE
CERTIFICATE OF CORRECTION

PATENT NO. : 3,955,935
DATED : May 11, 1976
INVENTOR(S) : Quentin O. Shockley and James O. Hodshire It is certified that error appears in the above-identified patent and that said Letters Patent are hereby corrected as shown below:

```
Col. 1, lines 29 and 30, "oxidation" should read
                  -- oxidizing --.
Col. 2, line 31, "proper" should read -- prior --;
        line 32, "aluminumchromium" should read
                  -- aluminum-chromium --;
        line 47, after "obtained" change "were" to -- where --.
Col. 4, line  1, "TRW-VA" should read -- TRW-VI --;
        line 48, enclose "green" in quotation marks
                  -- "green" --.
Col. 5, line 38, enclose "green" in quotation marks
                  -- "green" --;
        line 52, "furance" should read -- furnace --;
        line 58, after "was" change "the" to -- then --.
Col. 6, line  2, "colored" should read -- ordered --;
        line 30, "Te" should read -- The --;
        line 61, enclose "green" in quotation marks
                  -- "green" --.
Col. 7, line 16, "aluminumchromium" should read
                  -- aluminum-chromium --;
        line 42, "aluminumchromium" should read
                  -- aluminum-chromium --;
        line 51, "engironment" should read -- environment --;
        line 61, "chromiumaluminum" should read
                  -- chromium-aluminum --;
        line 67, enclose "green" in quotation marks
                  -- "green" --.
Col. 8, line  7, enclose "green" in quotation marks
                  -- "green" --.
Col. 10, lines 16 and 17, "chromiumaluminum" should read
                  -- aluminum-chromium --.
```

Signed and Sealed this

Twenty-third Day of November 1976

[SEAL]

Attest:

RUTH C. MASON
*Attesting Officer*

C. MARSHALL DANN
*Commissioner of Patents and Trademarks*